UNITED STATES PATENT OFFICE.

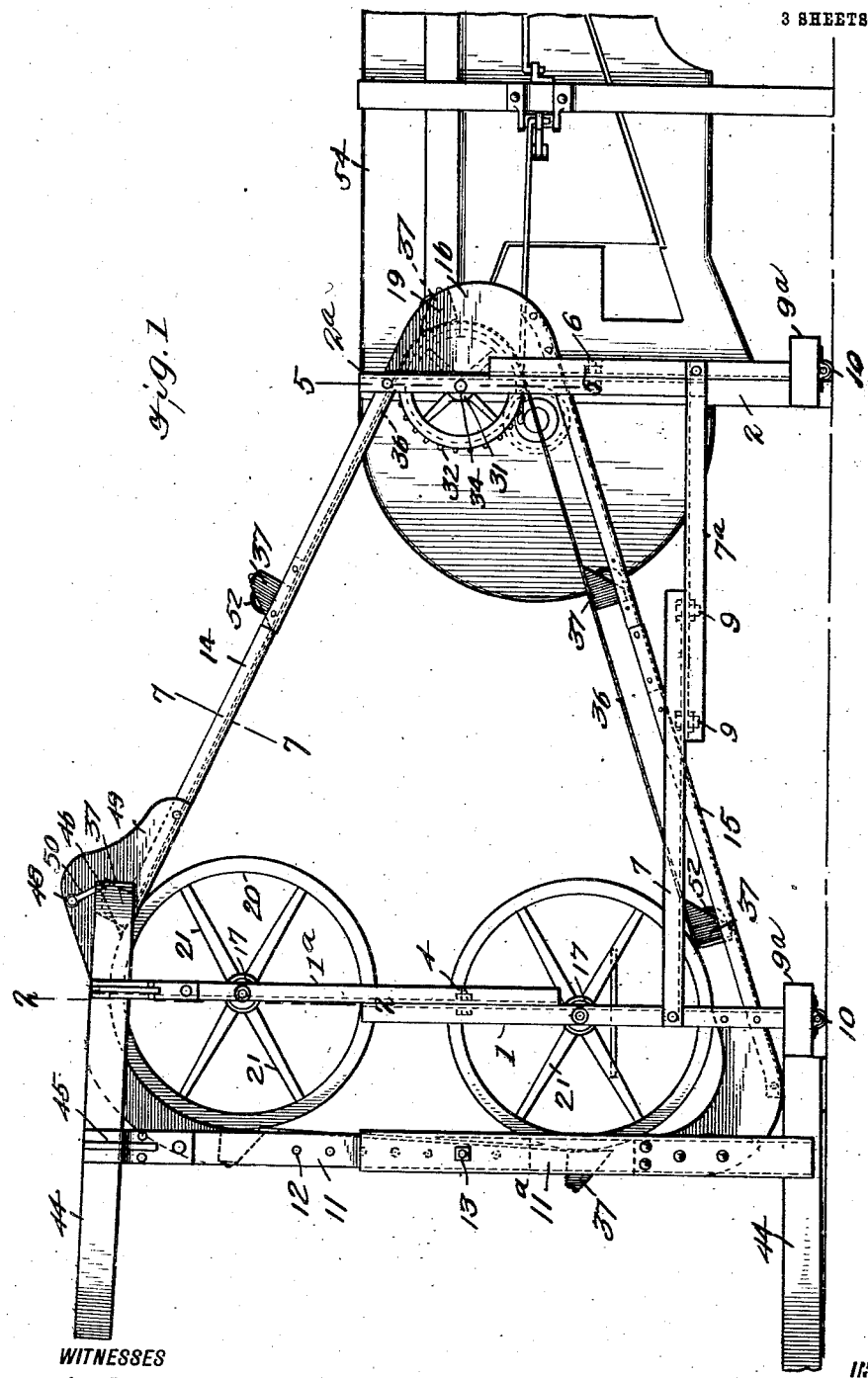

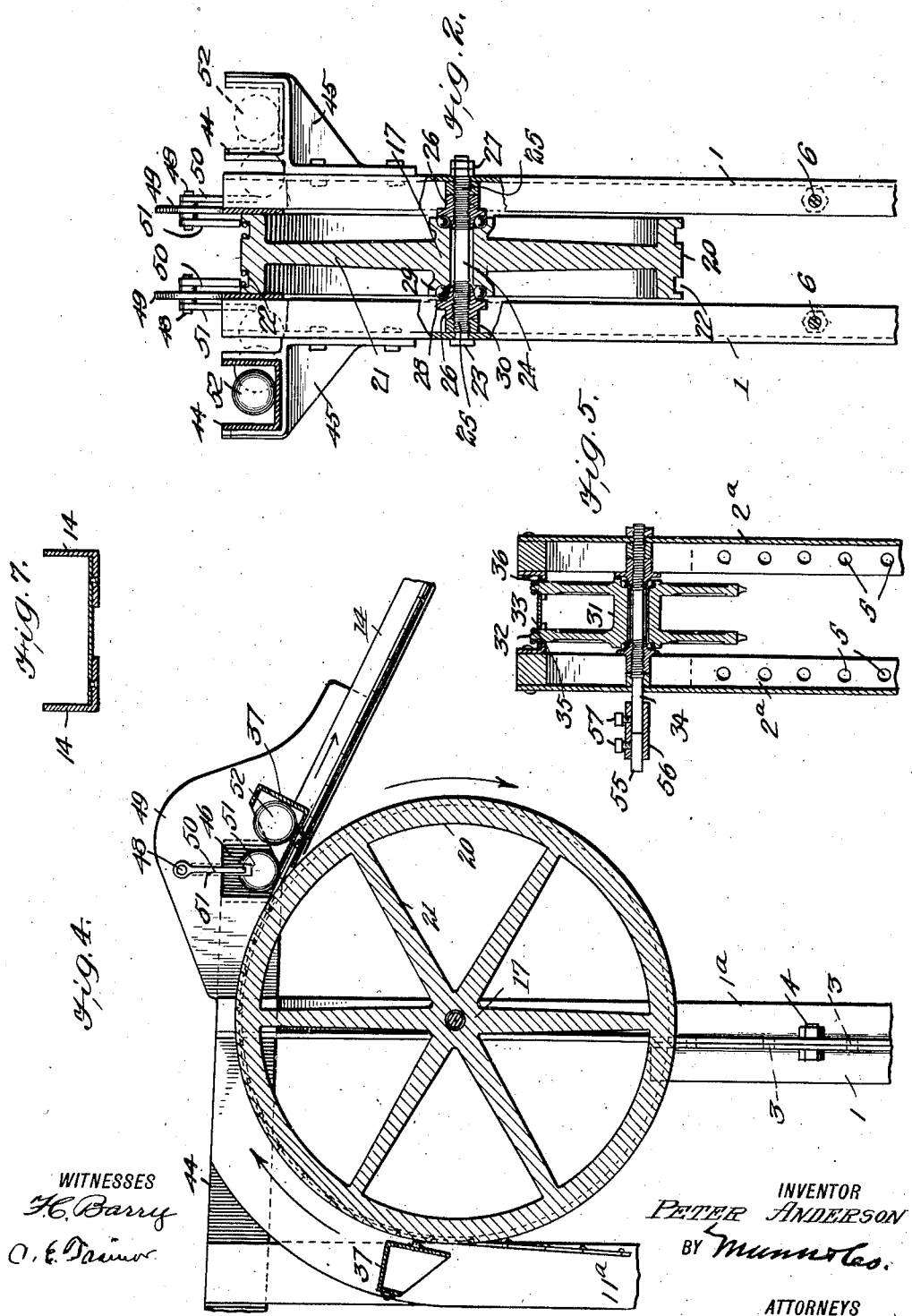

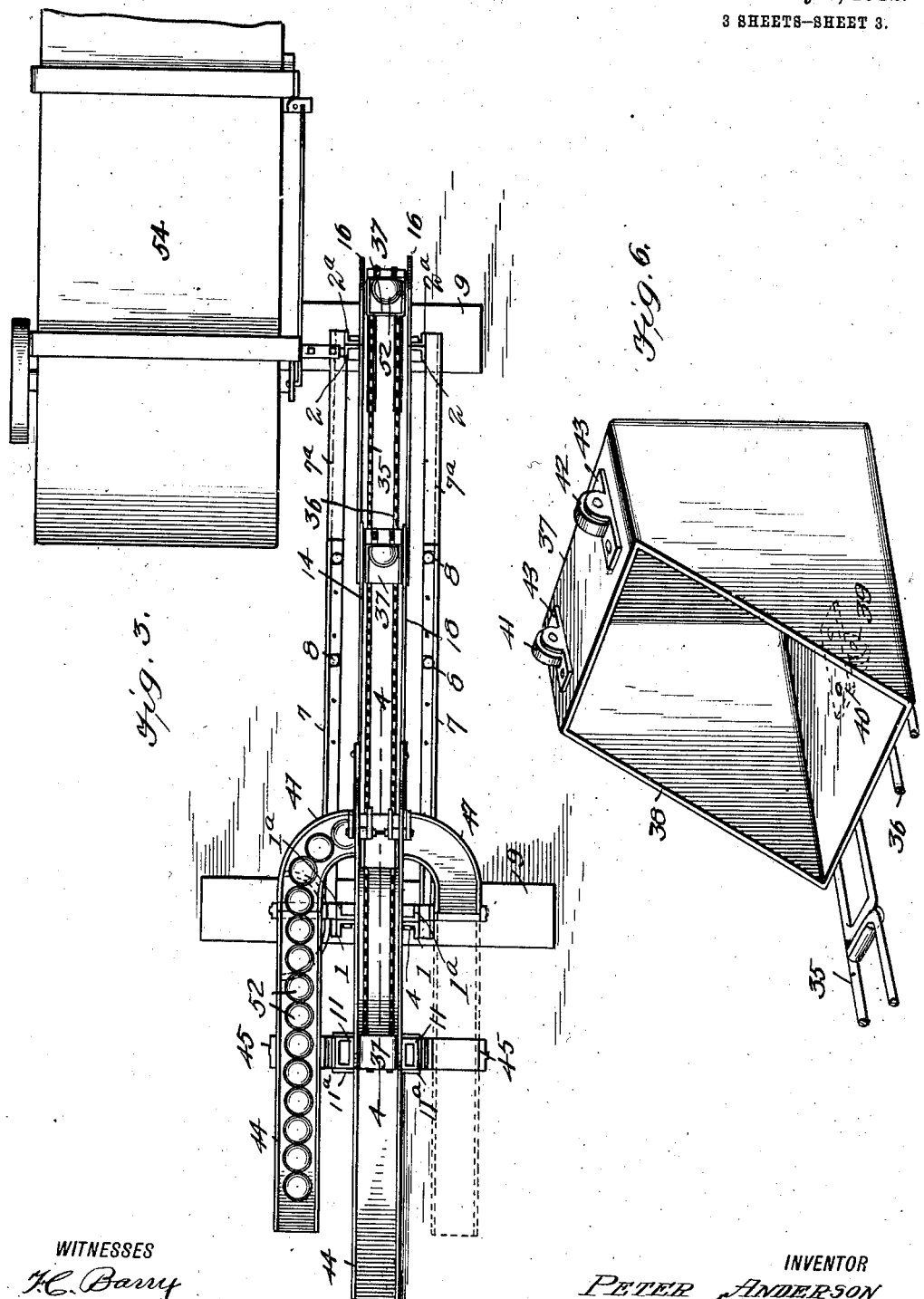

PETER ANDERSON, OF SPOKANE, WASHINGTON, ASSIGNOR TO JOSEPH LUCAS, OF SPOKANE, WASHINGTON.

MOTOR.

1,025,776. Specification of Letters Patent. Patented May 7, 1912.

Application filed June 16, 1911, Serial No. 633,482. Renewed March 6, 1912. Serial No. 682,061.

*To all whom it may concern:*

Be it known that I, PETER ANDERSON, a citizen of the United States, and a resident of Spokane, in the county of Spokane, State of Washington, have invented a new and useful Improvement in Motors, of which the following is a specification.

My invention is an improvement in motors, and has for its object the provision of a simple, economical mechanism especially adapted for running light machinery, which will, while delivering a constant and steady motive force, only require the attention of the operator at intervals, thus permitting his attention to be given practically wholly to the machinery.

In the drawings: Figure 1 is a side view of the improvement; Fig. 2 is a section on the line 2—2 of Fig. 1; Fig. 3 is a plan view; Fig. 4 is a section on the line 4—4 of Fig. 3; Fig. 5 is a section on the line 5—5 of Fig. 1; Fig. 6 is a perspective view of a bucket; and Fig. 7 is a section on the line 7—7 of Fig. 1.

The present embodiment of the invention comprises a frame of suitable size composed of four sectional uprights arranged in pairs, the pairs being adjustably connected to permit the frame to be enlarged or contracted.

The uprights arranged at one end of the frame, are similar in construction and are spaced apart laterally from each other. Each upright is composed of sections 1 and $1^a$, each section having a longitudinal series of openings 3 for receiving a bolt 4 for connecting the sections together. The other pair of uprights is also composed of sections 2—$2^a$, and each section has a longitudinal series of openings 5 for receiving a bolt 6 to connect the sections together. The said sections are preferably composed of angle plates, as indicated in Fig. 5.

The uprights at each side of the frame are connected by sectional bars. Each of the bars is composed of sections 7—$7^a$, each having a longitudinal series of openings adapted to register with the openings of the other section for receiving bolts 9 to connect the sections together. The members of each pair of uprights are connected at their bottoms by means of a transverse base plate $9^a$, and each plate is provided with wheels 10. Another pair of uprights is arranged adjacent to the uprights 1 and $1^a$, and each of the said uprights is composed of sections 11—$11^a$, each section having a longitudinal series of openings 12 for receiving bolts 13 to secure the sections together.

The three pairs of uprights support a trackway consisting of an upper inclined section 14, a lower section 15 inclined in the opposite direction, and a vertical connecting section 16. Each of the sections 14 and 15 is channel or U-shaped in cross section, and the section 16 is in the shape of a hood secured to the uprights 2—$2^a$. Each of the sections 14 and 15 is composed of two portions, and the lower end of the upper portion is seated in the upper end of the lower portion as shown in Fig. 1. The ends of the sections 14 and 15 are curved, as shown at 19, adjacent to the hood, and are connected to the hood in any suitable manner. The sections 14 and 15 are inclined in opposite directions and are nearest each other at the hood.

A wheel is mounted between the adjacent sections of the uprights 1—$1^a$, one wheel between the sections 1 and the other between the sections $1^a$. Each wheel consists of a hub 17 and a rim 20 connected by spokes 21. The rim of each wheel is provided with two annular grooves 22 and the hub is journaled on a stub shaft 23. The shaft is a bolt having a central plain portion 24 for receiving the hub, a threaded portion 25 on each side of the plain portion, and the threaded portions are engaged with sleeves 26. The ends of the bolt or shaft engage openings in the sections of the uprights and are held in place by nuts 27 on the outer side of the uprights. The sleeves 26 are provided with annular ribs 28 near the hub, and a ball bearing 29 is arranged between each rib and the adjacent end of the hub. A lock nut 30 is threaded onto the shaft adjacent to each sleeve and between the same and the uprights.

A wheel is arranged in the hood 16 between the uprights 2—$2^a$. The wheel consists of a hub 31 provided with spaced sprocket wheels 32. The said wheels extend through slots 33 in the bottom of the section 14 of the trackway. The wheel 31—32 is mounted on a shaft 34 in precisely the same manner as are the wheels 17—21—22 just described, as clearly shown in Fig. 5. A pair of endless sprocket chains 35—36 run on the tracks 14—15—16 and on the wheels just described, and the chains are connected at spaced intervals by the buckets shown in Fig. 6.

Each bucket 37 is substantially rectangular in cross section and open at its rear, and the side walls of the bucket are beveled forwardly from below upward, as indicated at 38. The lower face or bottom of each bucket is connected to both chains 35—36 and a wheel 39 is journaled in a bracket 40 at approximately the center of the bottom.

A pair of wheels 41 and 42 is journaled on the upper face or top of the bucket, in brackets 43, and the brackets are spaced apart laterally. The wheels 41 and 42 engage the trackway section 15, while the wheel 39 engages the section 14.

A trough 44 is arranged at each side of the upper wheel in the upright 1ª, each trough being supported in brackets 45 on the uprights 1ª and 11. The brackets are so arranged that when the troughs are in place the inner end of each trough inclines downwardly. A similar pair of troughs is arranged at the bottom of the uprights 1—1ª and 11—11ª, and the troughs are interchangeable. The track section 14 is provided with a lateral opening 46 at the inner end of each of the upper troughs, and a curved guide track 47 extends from the inner end of each trough to the adjacent lateral opening.

When the troughs are in place the inner end of the trough fits snugly against the outer end of the guide track, and a trip is provided at each of the lateral openings. Each trip consists of a shaft 48 journaled transversely of an extension wall 49 arranged alongside each side wall of the track section. An arm depends from each end of the shaft over the lateral opening, the inner arm 50 being in position for engagement by the buckets on the chains while the outer arm 51 blocks the opening on the outer side.

The motive power of the motor is a plurality of balls 52 which are held in the troughs 44 and pass therefrom into the buckets on the chains. The balls are admitted to the buckets by means of the trip. As each bucket passes the shaft 48 it engages the arm 50, swinging the said arm forwardly, and also the arm 51. The guide tracks 47 are inclined downwardly toward the track section 14 and the balls roll out by gravity. The balls cause the chains to travel and are finally discharged from the buckets at the lower end of the lower track section into the other troughs 44 at the bottom of the uprights. When the balls are exhausted from one trough the other is brought into action, and the empty trough is replaced by a full one from the bottom. The empty trough then replaces the one just removed from the bottom.

The motor is adapted to run any light machinery, and is shown connected to a fanning machine 54. The drive shaft 55 of the fanning machine is alined with the shaft 34 of the motor, and a sleeve 56 is arranged on the adjacent ends of the shafts and is locked to both shafts by set-screws 57. It is obvious that other methods of connecting the motor to the machine to be operated might be used.

The balls 52 may be of metal, concrete, or any other suitable material. By expanding or contracting the frame it may be adjusted to the size of the machine to be driven.

It will be evident that the operator may devote the greater portion of his time to the machinery operated, since the changing of the troughs will occupy only a portion of his time.

I claim:

1. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, wheels on the upper and lower faces of each bucket for engaging the trackways, means for connecting the double sprocket wheel to the machine to be operated, a plurality of balls for engaging the buckets to operate the motor, a supporting bracket arranged on each side of the end of the uppermost trackway remote from the hood, interchangeable troughs on the brackets, the trackway having lateral inlet openings near the inner ends of the troughs on the upper bracket, guideways leading from the said inner ends to the openings, a stop for each opening to prevent the entrance of the balls, and a trip in the trackway for engagement by the buckets to move the arm out of position, each trip comprising an arm for engagement by the bucket, a shaft to which the arm is secured, and a connection between the shaft and the stop.

2. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, wheels on the upper and lower faces of each bucket for engaging the trackway, means for connecting the double sprocket wheel to the machine to be operated, a plurality of balls for engaging the buckets to operate the motor, a supporting bracket arranged on each side of the end of the uppermost trackway remote from the hood, interchangeable troughs on the brackets, the trackway having lateral inlet openings near the inner ends of the troughs on the upper bracket, guideways leading the said inner ends to the openings, a stop for each opening to prevent the entrance of the balls, and a trip in the trackway for engagement by the buckets to move the arm out of position.

3. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, wheels on the upper and lower faces of each bucket for engaging the trackway, means for connecting the double sprocket wheel to the machine to be operated, a plurality of balls for engaging the buckets to operate the motor, a supporting bracket arranged on each side of the end of the uppermost trackway remote from the hood, interchangeable troughs on the brackets, the trackway having lateral inlet openings near the inner ends of the troughs on the brackets, guideways leading the said inner ends to the openings, and means operated by the movement of the buckets past the lateral openings for successively admitting the balls to the buckets.

4. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, wheels on the upper and lower faces of each bucket for engaging the trackway, means for connecting the double sprocket wheel to the machine to be operated, a plurality of balls for engaging the buckets to operate the motor, means for supporting the balls adjacent to the upper end of the upper trackway, and means operated by the buckets for successively admitting the balls to the bucket.

5. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, a plurality of balls for engaging the buckets to move the chains, and means at the upper end of the upper trackway operated by the buckets for successively admitting the balls to the buckets.

6. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, balls for engaging the buckets to move the chains, and means for introducing the balls into the buckets.

7. A motor comprising an expansible and contractible frame, upper and lower trackways on the frame extending longitudinally thereof and inclined in opposite directions, a hood connecting the trackways at their adjacent ends, a double sprocket wheel journaled in the hood, a wheel at the opposite end of each trackway, a plurality of spaced chains supported on the wheels and moving in the trackways, a plurality of buckets connecting the chains at spaced intervals, and balls for engaging the buckets to move the chains.

8. In combination, upper and lower trackways inclined in opposite directions and connected at their adjacent ends, an endless chain supported for movement in the trackways, wheels supporting the chain, buckets on the chain, balls for engaging the buckets to move the chains, and means operated by the buckets for successively admitting the balls.

PETER ANDERSON.

Witnesses:
A. WHALTIER,
EMIL HEDIN.